United States Patent [19]

Numan et al.

[11] 4,019,141
[45] Apr. 19, 1977

[54] PRESELECTOR CAVITY ARRANGEMENT AND RF SELECTIVITY ASSEMBLY

[75] Inventors: Daniel Orange Numan, Tamarac; Richard Dean Williamson, Fort Lauderdale, both of Fla.

[73] Assignee: Motorola, Inc., Schaumburg, Ill.

[22] Filed: Mar. 22, 1976

[21] Appl. No.: 668,761

[52] U.S. Cl. .............................. 325/357; 325/355; 174/35 TS; 174/52 R; 334/85; 361/397
[51] Int. Cl.[2] .......................................... H04B 1/08
[58] Field of Search .......... 325/352, 353, 355–357; 317/101 B, 101 C, 101 CB, 101 CC; 174/52 R, 58, 59, 65 R, 35 TS; 339/17 R, 17 C, 137, 138, 136 R; 330/68; 331/67; 334/85

[56] References Cited

UNITED STATES PATENTS

| | | | |
|---|---|---|---|
| 3,538,466 | 11/1970 | Brand | 325/357 |
| 3,624,515 | 11/1971 | Rezek | 325/357 |
| 3,644,848 | 2/1972 | Kruczek | 325/357 |
| 3,816,911 | 6/1974 | Knappenberger | 325/357 |
| 3,940,666 | 2/1976 | Chesney et al. | 325/355 |

FOREIGN PATENTS OR APPLICATIONS 557,469  11/1943  United Kingdom ............... 325/357

*Primary Examiner*—Howard W. Britton
*Assistant Examiner*—Jin F. Ng
*Attorney, Agent, or Firm*—Margaret Marsh Parker; James W. Gillman

[57] ABSTRACT

An improved preselector cavity arrangement and RF selectivity assembly includes a cast housing for the preselector with a plurality of interconnection apertures or slots, each being surrounded by a boss. Each boss is mated with a slot in an adjoining housing of an interconnected module for allowing input, output and injection connections to be made to the preselector without intermediate connections to the supporting printed circuit board. One adjoining housing may contain the RF amplifier with coupling and impedance matching to the amplifier output coil provided by a loop from the preselector input. The loop passes through the shielded aperture, couples to the output coil by passing around the coil form and then returns to ground on the preselector casting. The injection filter and tripler/mixer modules may be contained in other adjoining housings and also coupled to the preselector through shielded apertures. To minimize RF spray radiation no interconnections are made via the printed circuit board. All possible area on the board underneath the housing arrangement is plated and grounded to act as a Faraday shield for further reduction of RF spray radiation. The mating side of the preselector housing includes tabs which complete the shielding of the two end access slots when the side is soldered into place. A strap is soldered across the tops of the separate shields to complete the shielding effect.

8 Claims, 3 Drawing Figures

PRESELECTOR CAVITY ARRANGEMENT AND RF SELECTIVITY ASSEMBLY

BACKGROUND OF THE INVENTION

This invention relates to the field of RF shielding and particularly to a housing arrangement which will provide satisfactory shielding for the RF circuit modules to be mounted on a PC board of a miniature receiver.

More specifically the invention relates to an arrangement of interconnected housings for the prevention of spurious RF radiation.

A major problem in the design of UHF receivers is preventing spurious RF energy from bypassing the filtering circuits and entering the circuit at a point where only a narrow band of frequencies is desired. Shielding has previously been accomplished by enclosing the entire circuit in one complex housing to control spurious energy. Other prior art approaches have included separate housings with threaded interconnectors. All such solutions suffered from either high cost, difficulty of access or both.

SUMMARY OF THE INVENTION

It is, therefore, an object of the invention to provide improved shielding for the RF circuits of a receiver with a housing arrangement which is inexpensive, easy to fabricate and which allows easy access for repair. Another object is to provide an improved means of coupling from the RF amplifier coil to the preselector input. These objectives are accomplished according to the present invention by the use of a central case housing for the preselector coils in the form of a regular parallelepiped with one side removable. The interior of this housing is partially compartmentalized by partitions forming Faraday shields between coils. Interconnections with the preselector are done by means of apertures in the sides of the housing, each of which is surrounded or substantially surrounded by a boss. Each adjoining circuit module is housed in a shield can having a slot which is dimensioned to fit around one of the bosses. Because of the bosses, the tolerances for the can slots need not be excessively close though maintaining tight shielding. The preselector input wire is formed into a loop which passes through an aperture into the RF amplifier housing, slips down around the RF amplifier output coil and returns to ground at a notch in the surrounding boss. The high impedance connection of the second pole of the injection filter is coupled from a terminal supported by the filter coil form, through a second aperture to a tap on the preselector output coil. The preselector output coil and injection filter are coupled through a third aperture to a terminal on the tripler/mixer module. All interconnections are thus made without bringing leads to the PC board where spurious radiation can enter the system. After all modules have been completely assembled, a grounding strap is soldered across the tops of all the housings to complete the shielding. The plated ground connections on the PC board under or near the housing arrangements are enlarged to cover all area not needed for tuning holes, etc., thus forming a large Faraday shield under the whole housing arrangement.

DESCRIPTION OF A PREFERRED EMBODIMENT

Figure 1:
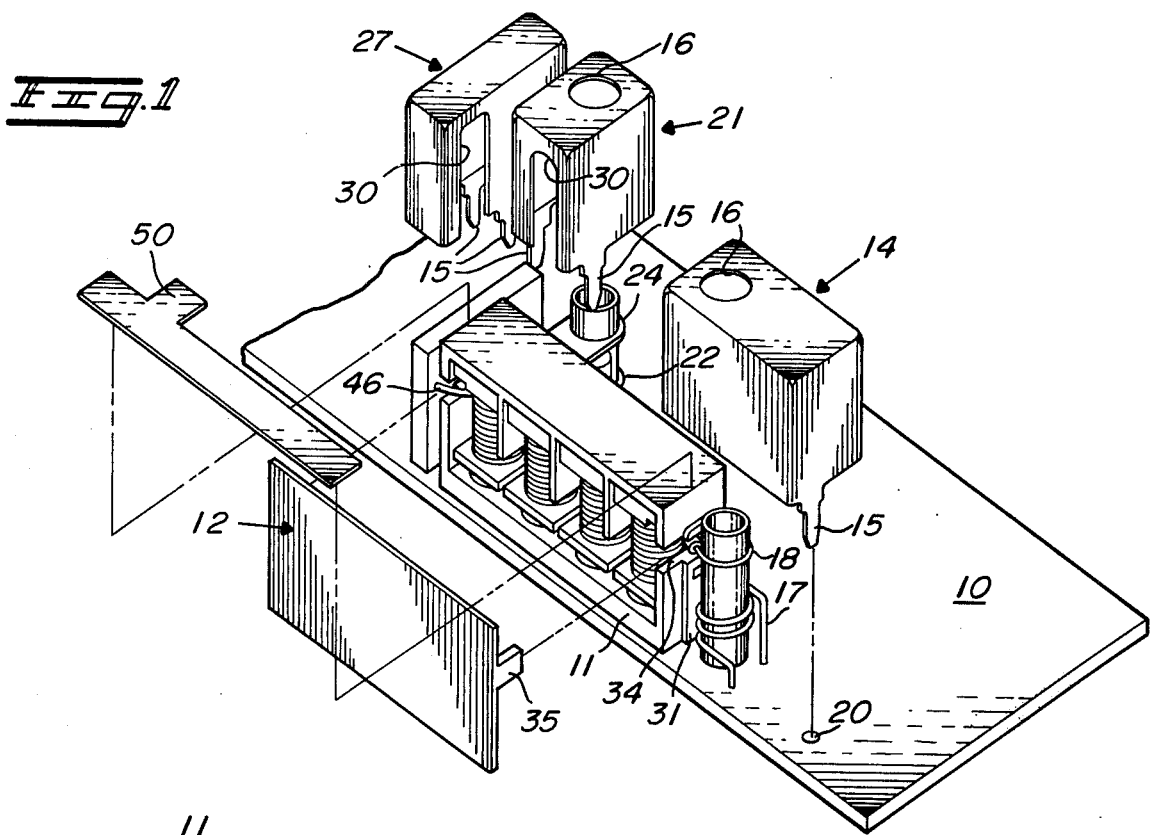
FIG. 1 is an exploded view of a preferred embodiment of a housing arrangement according to the invention with a portion of a PC board for mounting the arrangement.
Figure 2:
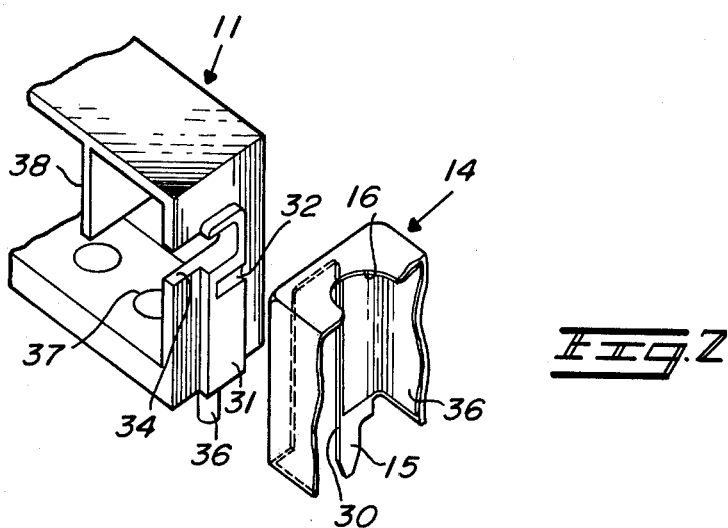
FIG. 2 is a detail of one of the structure interconnections of FIG. 1.

The structure of the housing arrangement according to the invention is best understood in relation to FIGS. 1 and 2. A typical RF circuit, which might form a part of the assembly as used, is shown in FIG. 3 but, apart from its shielding requirements, does not form a part of the invention.

In FIG. 1 a portion of a PC board 10 is shown with some of the parts of the RF selectivity assembly to be mounted on it. A main preselector housing portion 11 and a mating preselector housing side 12 are shown with some components of the four pole preselector circuit 13 (FIG. 3) visible within the main portion. The RF amplifier housing 14 has been raised to show one of the mounting tabs 15, a tuning aperture 16, an output coil 17, a coupling loop 18 of the RF amplifier circuit 19 (FIG. 3) and one of six mounting holes 20 in the PC board 10. The injection filter housing 21 is elevated to show the placement of the coil 22 of the injection filter circuit 23 (FIG. 3). Supported by the coil form of coil 22 is a terminal 24 to which the capacitors 25, 26 (FIG. 3) are connected. Also elevated from its mounting position is the housing 27 for the tripler/mixer circuit 28 which in this embodiment is encapsulated. Three slots 30 in the adjoining housings (FIGS. 1 and 2) fit over three bosses 31 (one visible). The boss at the tripler/mixer end of the preselector housing portion 11 is a mirror image of the boss for the RF amplifier interconnection, except that in the latter boss a small notch 32 is positioned for receiving a ground end 33 (FIG. 3) of the coupling loop 18. In this embodiment, the loop 18 consists of three quarters of a turn. Each of the two end bosses 31 includes a slot 34 which allows easier insertion of the circuit 13 components. When subassembly of the main preselector housing 11 and the preselector circuit 13 is completed, the mating side 12 is soldered into place with two tabs 35 (one shown) fitting partially into the slots 34 to complete the bosses shielding the end interconnections.

FIG. 2 shows more clearly the details of the housing interconnection with cut away portions of main part 11 of the cast housing and the RF amplifier housing 14. Shown in this view are one of two mounting pins 36 and one of four tuning apertures 37 in the cast housing part 11. More visible in this view is one of three partitions 38 which will be discussed hereinafter. Visible here in the RF amplifier housing 14 are the slot 30 and a portion of the Teflon coating 36 which lines the three housings 14, 21 and 27 for electrical insulation. With referenece to both FIGS. 1 and 2, it is clear that when one of the housings 14, 21 or 27 is properly in place next to a side of the main preselector housing part 11, the slot 30 will be fitted around the boss 31 and any connection between the two housings will be completely shielded. Since each boss 31 protrudes into a slot 30, the tolerances on the dimensions of the slot 30 are relatively broad and each adjoining housing can, as a whole, be more inexpensively produced than if mating slots in the sides of two housings had to be carefully aligned.

Figure 3:
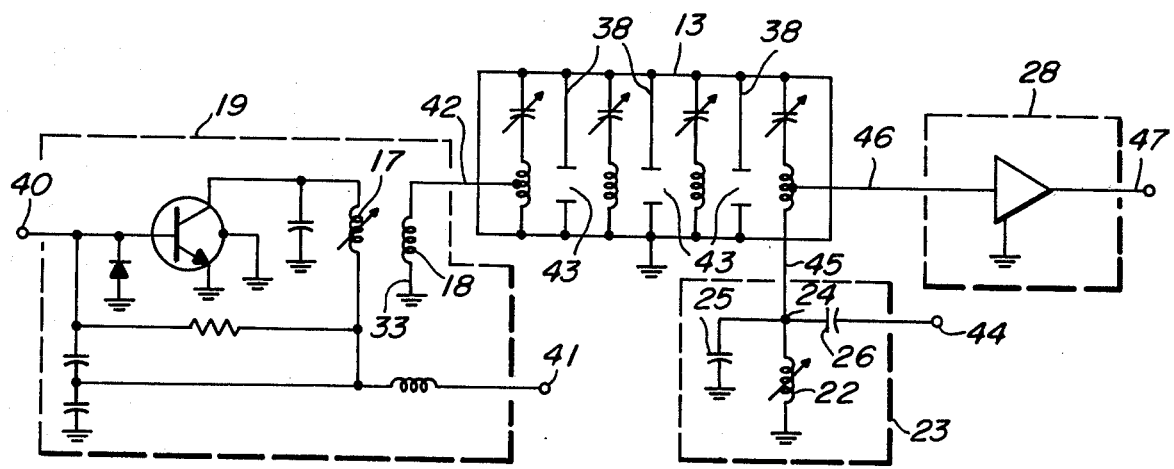
FIG. 3 is a schematic diagram of an RF selectivity circuit such as might utilize the invention.

A circuit for a receiver front end such as would require housing and shielding according to the invention is shown in FIG. 3, and is made up essentially of the RF amplifier circuit 19, the preselector circuit 13, the injection filter circuit 23 and the tripler/mixer circuit 28. An input terminal 40 is coupled to the antenna which may be the housing cover (not shown) of the receiver. The coupling circuitry (not shown) would include preliminary filtering of the input signal. A B+ terminal 41 is filtered to prevent signal input at that point. In the RF circuit 19 the RF signal is amplified and filtered, then coupled to a first interconnection point 42 which is the input to the preselector circuit 13. Low impedance coupling to the preselector is accomplished by the three quarter turn coil 18 which, as shown in FIG. 1, passes through the slot 34 in the main housing portion 11, passes around the supporting form of coil 17 and is grounded in the notch 32 in the adjacent boss 31.

In the housing of the four pole preselector 13, four cavities are defined by the inner surface of the housing portions 11 and 12, and the partitions 38. The coupling between the four poles is electrostatic and is determined by the dimensions of a plurality of ports 43. Each cavity is a capacity in parallel with the circuit contained therein, and together with the variable capacitor in series with the coil, provides the required filtering capability of the preselector. At a terminal 44, the output of a crystal oscillator circuit (not shown) is brought into the injection filter circuit 23. This oscillator output, which is rich in harmonics, is sharply filtered in circuit 23 to provide only the third harmonic of the oscillator frequency at a second interconnection point 45 between the circuits 23 and 13. This point, then, is one of the most critical points at which the entrance of spurious RF spray radiation must be prevented. This interconnection is made through the aperture 34 which need not be a slot, but is surrounded by the boss 31 which, in use, is enclosed by the housing 21 via one of the slots 30. Connection is made to the terminal 24. A third interconnection point 46, between the preselector circuit 13 and the tripler/mixer circuit 28, is the other most critical shielding point. This connection is made by bringing the preselector output lead through one of the apertures 34 to the circuit 28. As before, when the housing 27 is positioned, the boss 31 projects into it, the tab 35 of the housing mating side 12 completes the surround boss 31 and shielding of the interconnection point 46 is complete. The received and filtered signal and the filtered oscillator output are mixed in the tripler/mixer circuit 28 to provide the desired IF signal at the output terminal 47.

The purpose of the invention then is to provide a high level of shielding for the most critical interconnection points of an RF selectivity assembly which is built for relatively easy assembly and repair. This is done by means of apertures in a central cast housing, wherein after assembly, each aperture is completely surrounded by a boss which protrudes into an adjoining housing through a slot in that housing. All interconnections are made through the well-shielded apertures including particularly the loop from the preselection input which slips over the coil form of the RF amplifier. A ground strap 50 may be soldered across the tops of the housings. If repair or replacement of one of the adjoining circuit modules should become necessary, its housing is removable by merely unsoldering the two mounting tabs 15 from the PC board 10 and one end of the ground strap 50.

What is claimed is:

1. An improved preselector cavity and RF selectivity shielding arrangement for the RF circuitry of a radio receiver, the arrangement comprising:
   a cast preselector cavity having a plurality of apertures, each aperture being substantially surrounded by a boss;
   a plurality of adjoining housings, each having a slot in at least one side, each slot dimensioned to receive one of the bosses of said cavity;
   a plurality of interconnections between portions of the RF circuitry, said portions being contained within the cavity and the several housings, and said interconnections being made through said apertures, at least one of said interconnections comprising a loop from one circuitry portion which to substantially encircles a coil form in another of said circuitry portions; and
   a printed circuit board for mounting the housings.

2. A shielding arrangement according to claim 1 wherein the adjoining housings have tabs and an open side adjacent the PC board, the PC board having mounting apertures therein and the mounting aperture walls being adapted to receive and be soldered to the tabs of the housing.

3. A shielding arrangement according to claim 2 wherein the printed circuit board comprises a substantial area of grounded plated area for electrostatic shielding of the open ends of the housings.

4. A shielding arrangement according to claim 1 wherein the preselector cavity is comprised of at least two mating portions adapted to being soldered together to form a closed housing.

5. A shielding arrangement according to claim 4 wherein at least one portion of the preselector cavity comprises at least one projection for completing the boss around the aperture in another one of the portions.

6. A shielding arrangement according to claim 4 wherein at least one of the portions of the preselector cavity comprises partitions for subdividing the area within the cavity and for providing electrostatic shielding between the subdivided areas.

7. A shielding arrangement according to claim 1 wherein at least one of the cavity portions contains a coil and components in one of the adjoining housings are electromagnetically coupled to the coil by means of a conductor passed through one of the cavity apertures and forming a loop adjacent the coil.

8. A shielding arrangement according to claim 7 wherein the boss surrounding the one housing aperture is formed to conductively receive an end of said loop for grounding said end.

* * * * *